(12) United States Patent
Bailey

(10) Patent No.: US 10,201,835 B1
(45) Date of Patent: Feb. 12, 2019

(54) MOUNTING SYSTEM FOR A WIRE SCREEN PANEL

(71) Applicant: Edwin C. Bailey, East Amherst, NY (US)

(72) Inventor: Edwin C. Bailey, East Amherst, NY (US)

( * ) Notice: Subject to any disclaimer, the term of this patent is extended or adjusted under 35 U.S.C. 154(b) by 0 days.

(21) Appl. No.: 15/244,914

(22) Filed: Aug. 23, 2016

Related U.S. Application Data

(60) Provisional application No. 62/269,469, filed on Dec. 18, 2015.

(51) Int. Cl.
| | |
|---|---|
| *B07B 1/46* | (2006.01) |
| *F16B 21/10* | (2006.01) |
| *F16B 35/00* | (2006.01) |
| *F16B 43/00* | (2006.01) |

(52) U.S. Cl.
CPC .......... *B07B 1/4681* (2013.01); *B07B 1/4645* (2013.01); *F16B 21/10* (2013.01); *F16B 35/005* (2013.01); *F16B 43/00* (2013.01)

(58) Field of Classification Search
CPC ... B07B 1/4609; B07B 1/4645; B07B 1/4672; B07B 1/4681; B07B 2201/02; F16B 21/10; F16B 35/005; F16B 43/00
USPC ....... 209/319, 400, 401, 403, 405, 408, 409, 209/412
See application file for complete search history.

(56) References Cited

U.S. PATENT DOCUMENTS

| | | | | | |
|---|---|---|---|---|---|
| 3,272,061 | A | * | 9/1966 | Seckerson | ............... F16B 21/02 411/15 |
| 4,871,288 | A | * | 10/1989 | Schmidt | ................ B07B 1/4645 209/399 |
| 4,909,929 | A | * | 3/1990 | Tabor | ................... B01D 25/002 209/395 |
| 5,049,262 | A | * | 9/1991 | Galton | ...................... B07B 1/18 209/399 |
| 5,361,911 | A | * | 11/1994 | Waites, Sr. | ............ B07B 1/4645 209/399 |
| 5,398,817 | A | * | 3/1995 | Connolly | .................. B07B 1/46 209/399 |
| 5,699,918 | A | * | 12/1997 | Dunn | .................... B07B 1/4645 209/397 |
| 5,816,413 | A | * | 10/1998 | Boccabella | ........... B07B 1/4645 209/399 |

(Continued)

*Primary Examiner* — Joseph C Rodriguez
(74) *Attorney, Agent, or Firm* — Phillips Lytle LLP; David L. Principe

(57) ABSTRACT

A system for mounting a wire screen panel to a frame for screening particulate materials. The frame has a stringer with a ferrule defined therein. The system comprises a screen panel having a first plurality of wires and a second plurality of wires disposed. The screen panel has a first side and a second side disposed opposite from the first side. The screen panel has a first end and a second end disposed opposite from the first end. A plate is disposed along at least a portion of the length of the first side of the screen panel. A fastener having a shaft and a head portion is configured and arranged to extend adjacent to the plate and to engage with a bushing disposed in the ferrule in the stringer. The head portion of the fastener engages with the plate on the side of the plate opposite the stringer such that the screen panel is fixed in position relative to the frame.

22 Claims, 4 Drawing Sheets

(56) References Cited

U.S. PATENT DOCUMENTS

| | | | | |
|---|---|---|---|---|
| 5,938,042 A * | 8/1999 | Freissle | ............... | B07B 1/4645 209/405 |
| 6,811,033 B1 * | 11/2004 | Owen | ............... | F16B 5/0208 209/399 |
| 7,841,476 B2 * | 11/2010 | Johnson | ............... | B07B 1/4645 209/392 |
| 7,946,428 B1 * | 5/2011 | Lane | ............... | B07B 1/4645 209/395 |
| 8,025,153 B2 * | 9/2011 | Freissle | ............... | B07B 1/46 209/397 |
| 8,028,840 B2 * | 10/2011 | McGregor | ............... | B07B 1/4645 209/393 |
| 8,127,932 B2 * | 3/2012 | Trench | ............... | B07B 1/4645 209/319 |
| 8,371,450 B2 * | 2/2013 | McGregor | ............... | B07B 1/4645 209/399 |
| 8,898,905 B2 * | 12/2014 | Bailey | ............... | B01D 29/012 29/896.6 |
| 9,186,703 B2 * | 11/2015 | Lane | ............... | B07B 1/4645 |
| 9,327,318 B2 * | 5/2016 | Paul | ............... | B07B 1/4645 |
| 9,375,757 B2 * | 6/2016 | Wardell, Jr. | ............... | B07B 1/4645 |
| 9,486,836 B2 * | 11/2016 | Strong | ............... | B07B 1/46 |
| 2006/0180510 A1 * | 8/2006 | Freissle | ............... | B07B 1/46 209/405 |
| 2006/0196813 A1 * | 9/2006 | Kadel | ............... | B07B 1/46 209/405 |
| 2011/0247969 A1 * | 10/2011 | Pryde | ............... | B07B 1/4645 209/405 |
| 2013/0037459 A1 * | 2/2013 | Woodgate | ............... | B07B 1/4645 209/405 |

* cited by examiner

MOUNTING SYSTEM FOR A WIRE SCREEN PANEL

CROSS-REFERENCE TO RELATED APPLICATION

The present application claims priority benefit of U.S. Provisional Patent Application No. 62/269,469 filed Dec. 18, 2015, entitled "Mounting System for a Wire Screen Panel" which is incorporated herein by reference.

TECHNICAL FIELD

The present invention relates generally to the field of screens for particulate materials such as aggregate and mineral ores, and more particularly to a method of mounting individual screen panels in a modular screen system.

BACKGROUND ART

Screening arrangements are known for screening particulate materials such as mineral ores as described in U.S. Pat. No. 4,892,767 ("the '767 patent"). According to the '767 patent, screening panels are attached to a support frame using projections extending from the screening panel. More specifically, the projections are inserted in corresponding holes in the support frame to attach the screening panel to the support frame. A number of apertures are formed in the screening panel to screen the ore. The screening panels may be integrally formed from media such as urethane or rubber that may be injection molded or open cast molded. The urethane and rubber media may have some advantages over steel media such as extended wear life and reduced noise. However, there are some steel screen designs that provide for greater throughput, and therefore there is a need for replacement steel screen panels for some applications. The typical frame is made intentionally large and heavy, usually of metal such as steel to withstand rigorous screening use. Accordingly, the typical support frame is not modified or replaced easily. Therefore, in order to substitute steel media into preexisting frames it has been known to mold urethane onto the sides of the steel media panels or to slide preformed, molded strips onto the sides of the panels. The molded urethane extends along the sides of the steel media panel and may include molded projections for securing the panel to the existing frame. Although the existing frame is utilized, the cost and additional manufacturing steps required to mold urethane onto steel screen panels are drawbacks. Accordingly, there is a need for a wire screen panel constructed of steel or the like that may be easily modified for attachment to existing support frames designed for use with panels constructed of other materials such as polyurethane or rubber.

BRIEF SUMMARY OF THE INVENTION

With parenthetical reference to the corresponding parts, portions or surfaces of the disclosed embodiment, merely for the purposes of illustration and not by way of limitation, one aspect of the present invention provides a screen panel (10) that is adapted for mounting onto an existing frame. The existing frame may include beams or stringers (31) having a plurality of ferrules (44) disposed therein. The ferrules (44) may be spaced in intervals of 2-per-foot or 3-per-foot. The ferrules (44) may include an opening (47) which may have threads (50) for receiving bushings (53). The bushings (53) may be provided with an opening (59) for receiving a pin (37) or bolt.

The steel screen panel (10) may be formed from woven or nonwoven metal wires such as steel or the like. A nonwoven steel screen formed by welding may be constructed as described in U.S. Pat. No. 5,205,877, which is incorporated herein by reference. The steel screen panel (10) may be provided with a plate (19) near a side of the screen panel (10) that is to be attached to the frame. The steel wire may be cut in the area of the plate (19) such that at least a portion of the plate (19) is exposed. The exposed portion of the plate (19) may be provided with a substantially semicircular opening (25) along the edge (28) of the plate (19) where material has been removed. The semicircular opening (25) may receive a pin (37) or a bolt for attaching the panel (10) to the frame. The screen panel (10) may be disposed along a stringer (31) on a frame such that a corresponding second screen panel having a plate with a semicircular opening abuts the first steel screen panel such that the semicircular openings form a round opening sized to receive the shaft (34) of a fastener that extends to the stringer (31). The screen panels (10) may be attached to the frame by a pin-style fastening system or may be attached by a bolt. The head (40) of the bolt or pin (37) engages with the top surface (22) of the plate (19) around the semicircular opening (25) such that the bolt or pin (37) is capable of securing the steel screen panel to the frame.

DESCRIPTION OF THE PREFERRED EMBODIMENTS

Figure 1:
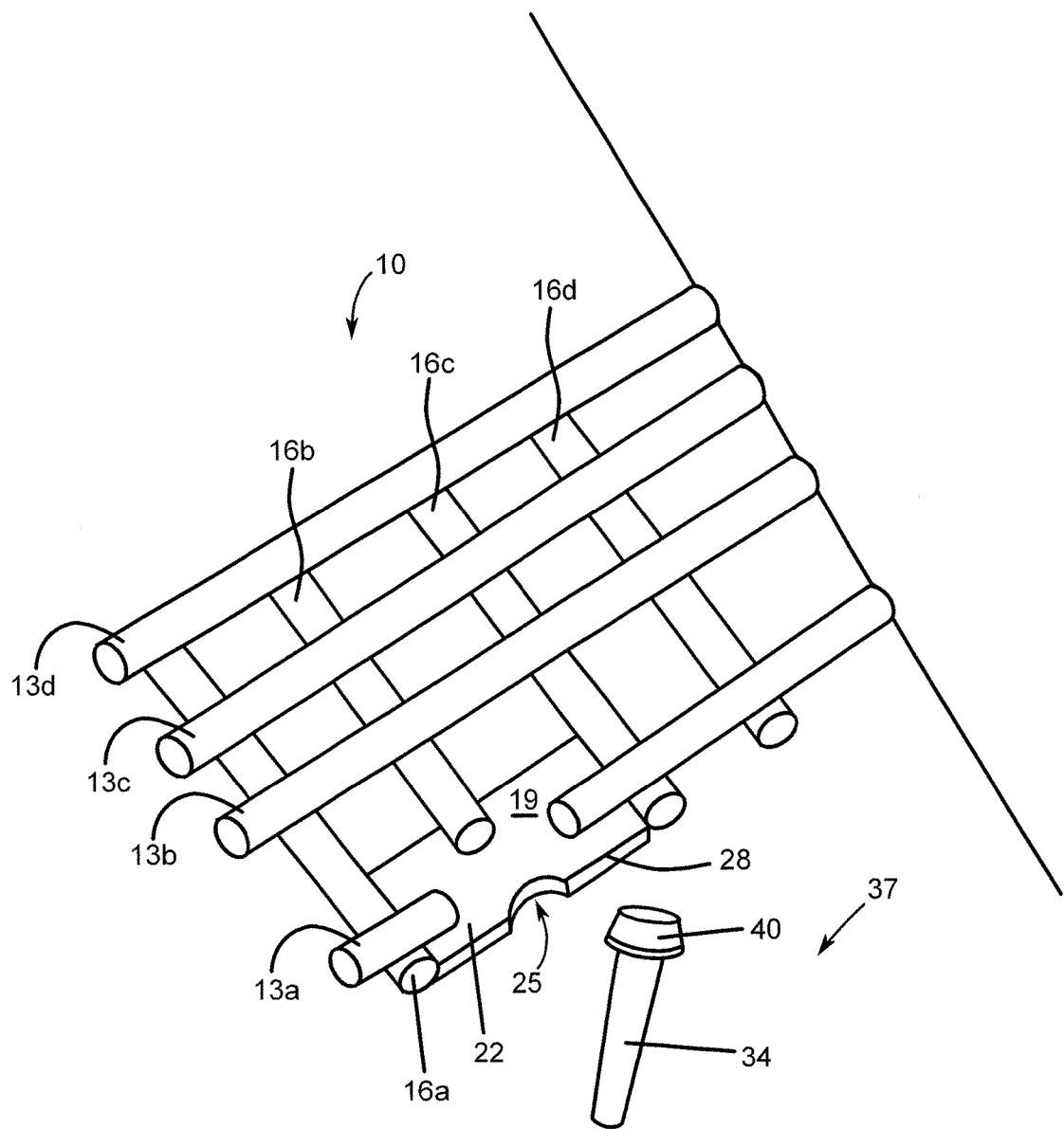
FIG. 1 is a perspective view of a portion of one embodiment of a steel screen panel.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Referring now to the drawings, and more particularly to FIG. 1 thereof, one embodiment of the invention provides a wire screen panel having a first plurality of wires and a second plurality of wires. In one example, a wire screen panel 10 has a plurality of longitudinal wires 13a, 13b, 13c, and 13d, and a plurality of transverse wires 16a, 16b, 16c, and 16d. The wires 13a-d and 16a-d are disposed such that they intersect at junctions where the wires are joined by welding. The wires 13a-d and 16a-d may be constructed of high carbon steel. The wire screen panel 10 shown is nonwoven and may be formed by a welding process described in U.S. Pat. No. 5,205,877 which is incorporated herein by reference. As an alternative, the wire screen panel 10 may be woven from pre-crimped wires either manually or through the use of machines. The wire screen panel 10 may be provided as a modular unit in various sizes. In one example the panel may have a size of 1'×2'. This size provides for ease of handling and replacement of individual screen panels 10 that may need to be replaced due to wear.

As shown in the lower left hand portion of the screen panel 10, a plate 19 may be attached to a portion of the panel 10. Alternatively, the plate 19 could be attached along the full length of the panel 10. The plate 19 may be attached near the side of the panel 10 where the panel is attached to the frame. As shown a portion of longitudinal wire 13a has been removed and a portion of transverse wire 16a has been removed in the area adjacent to the plate 19. Accordingly, an upper surface 22 of the plate 19 is exposed. The plate 19 may be provided with a semicircular opening 25 along a side edge 28 where material has been removed from the plate 19. The plate 19 may be attached to the screen panel 10 by welding or the like. The plate 19 provides structure for attaching the wire screen panel 10 to a stringer 31 (FIG. 2) on the frame. The longitudinal wire 13a may be positioned along the side and almost flush with the ends of the transverse members 16a-d so that the wire 13a provides some protection from granular materials contacting the stringer 31. The plate 19 also protects the stringer 31. Depending on how abrasive the materials passing through the screen are, contact with the stringer 31 may cause the stringer 31 to have to be replaced due to excessive wear.

Figure 3:
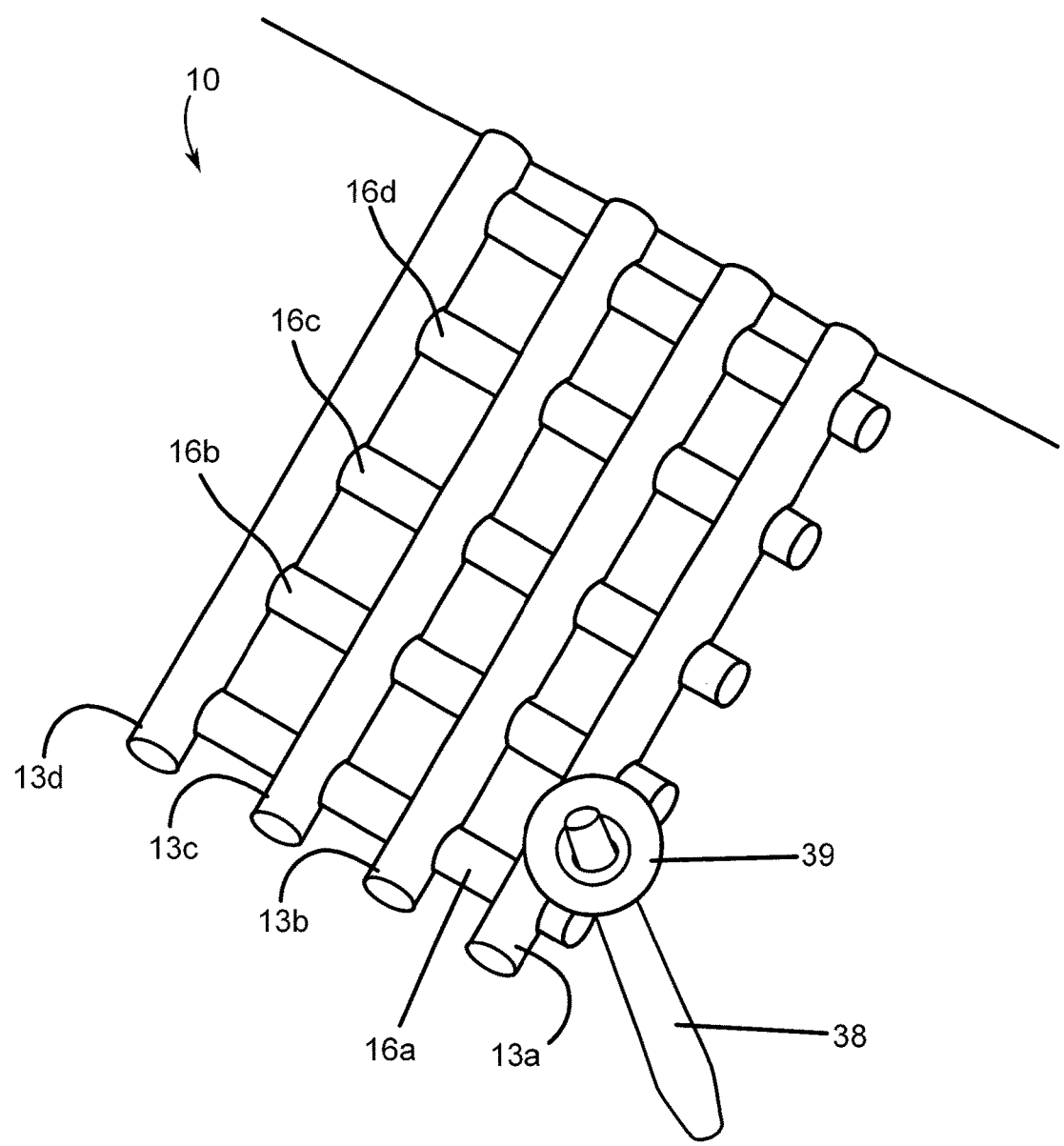
FIG. 3 is a perspective view of an alternate embodiment of the steel screen panel shown in FIG. 1.

The semicircular opening 25 in the plate 19 is sized to receive a portion of the shaft 34 of a pin 37 or bolt. The opening 25 is juxtaposed with a corresponding opening on a mirror image panel (not shown) that abuts with panel 10. The semicircular openings combine to form a circular or round opening to surround the shaft 34. The head 40 of the pin 37 engages with the plate 19 to secure the wire screen panel 10 to the stringer 31. As an alternative shown in FIG. 3, a longer pin 38 may be used with a washer 39 on top of the screen panel which would replace the plate 19.

Figure 2:
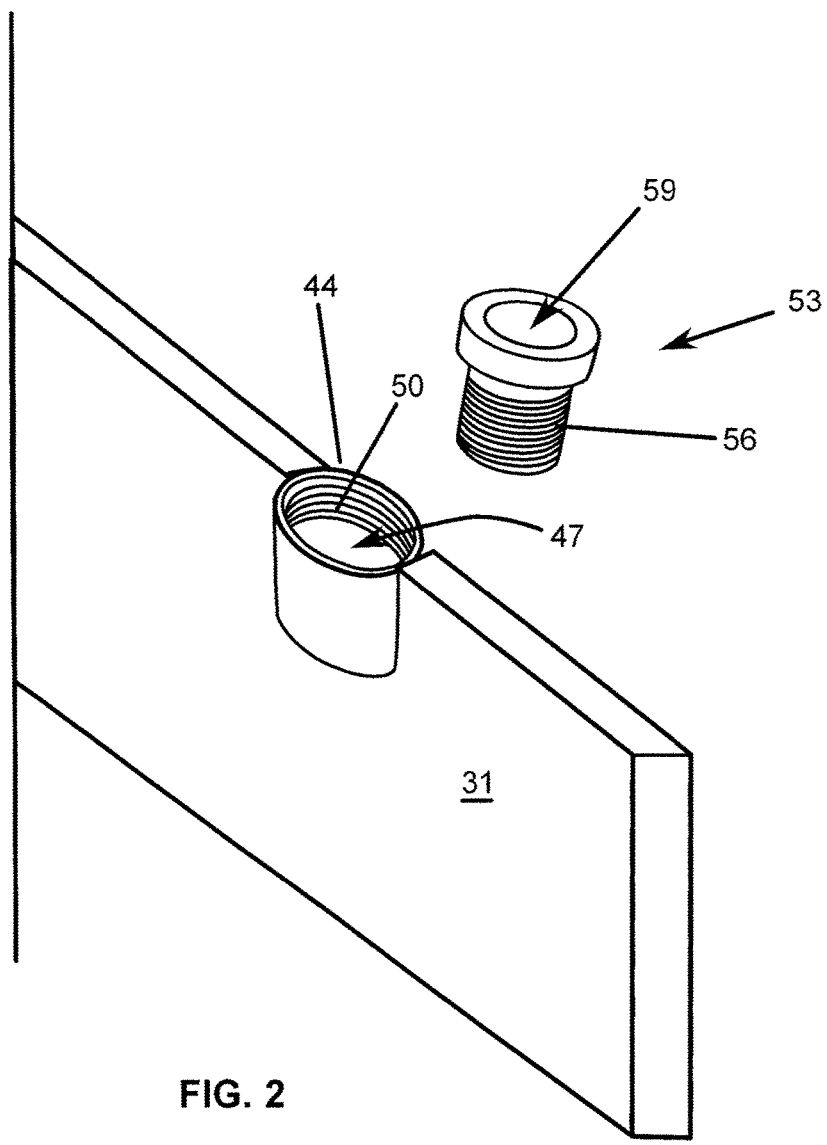
FIG. 2 is a perspective view of a portion of a stringer with a ferrule disposed therein and a bushing.

Turning to FIG. 2, a portion of a stringer 31 with a single ferrule 44 is shown. A stringer 31 may be provided with two or three ferrules 44 per foot. The stringer 31 is a support beam that is part of a frame that supports the screen panels 10. The ferrule 44 is disposed on or integrally formed in the stringer 31. The ferrule 44 is a ring shaped member with a central opening 47. The inner walls of the ferrule 44 surrounding the central opening may contain screw threads 50. Alternatively, a bushing may be friction fit into the ferrule 44 without the use of threads. For example, a bushing having a larger diameter head at the top and a flange at the bottom may be knocked or forced into the ferrule 44 such that the flange at the bottom deflects inward as it passes through the ferrule 44 and then expands upon exiting the opening in the ferrule 44 to hold the bushing in position. Alternatively, the flange at the bottom may engage with the inner walls of the ferrule 44. The stringer 31 may be formed from a steel bar having a thickness of approximately ½". The stringer 31 is preferably made as narrow as possible to maximize the number of openings in the wire screen panel 10 to increase the throughput of the system. Worn ferrules 44 can be cut out and replaced without replacing the entire stringer 31.

A bushing 53 may have a set of external threads 56 sized to engage with the internal threads 50 in the ferrule 44. Accordingly, the bushing 53 may be installed in the ferrule 44. The bushing 53 may be designed with a central opening 59 for receiving a pin 37 or bolt for attaching the wire screen panel 10 to the stringer 31. The bushing 53 has an interior surface surrounding the central opening 59 that is designed to engage with and hold the pin 37 in a locking arrangement when the pin 37 is inserted into the opening 59. This pin-style fastening system is standard in the mining and aggregate industries and will be evident to those of ordinary skill in the art. As an alternative, the bushing 53 may be provided with a set of internal threads in the interior wall surrounding opening 59 that mate with the external threads on a bolt. Accordingly, the wire screen panel 10 may be bolted to the bushing 53 in the stringer 31. In another alternative, the bushing 53 may have a two piece construction with an outer adapter and an inner sleeve. The sleeve may be configured and arranged to receive a pin as described above.

Figure 4:
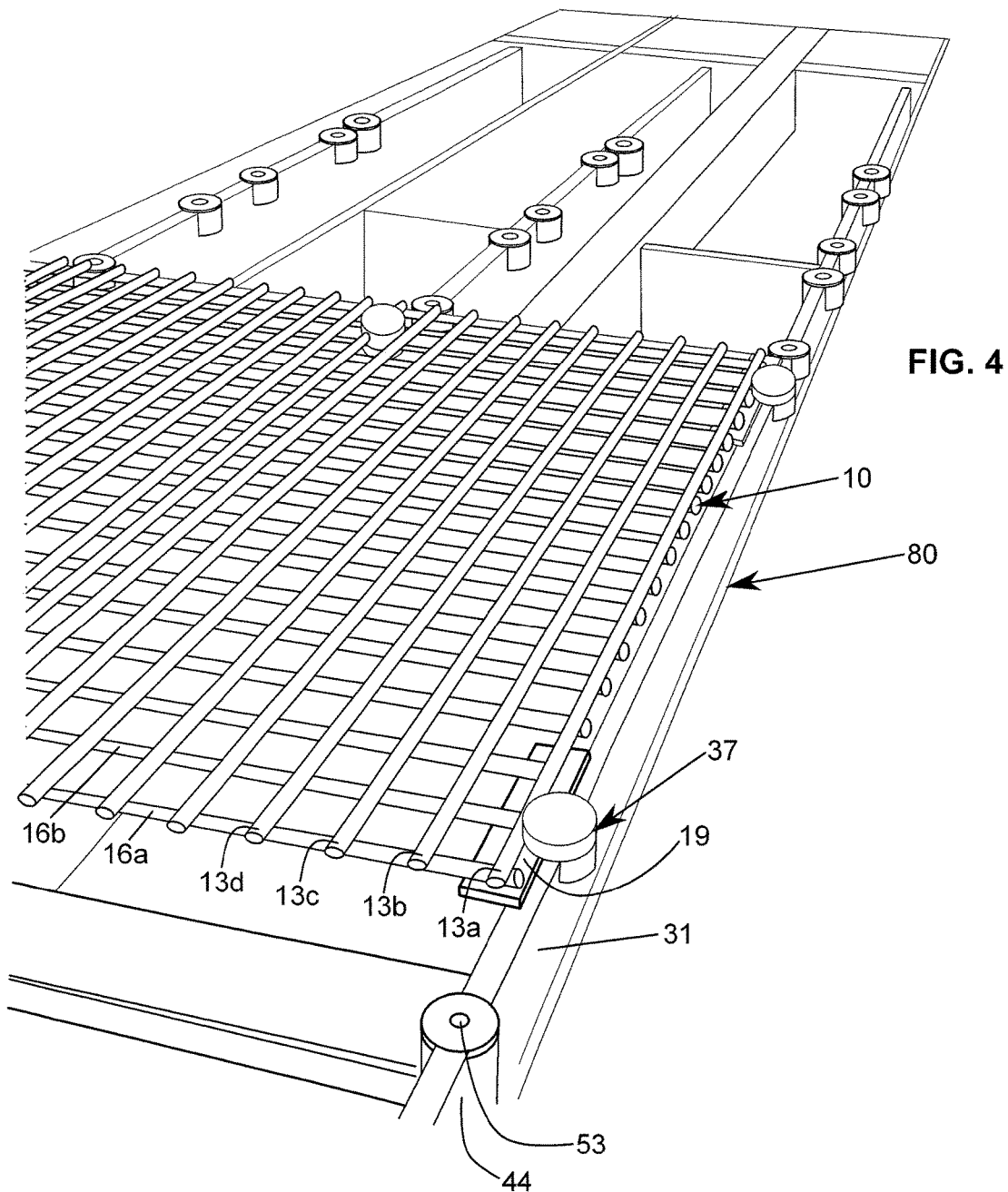
FIG. 4 is a perspective view of a wire screen panel mounted on a frame.

Turning to FIG. 4, a wire screen panel 10 is mounted to a support frame 80. The screen panel 10 is held in position by the pin 37. The pin 37 is secured to a bushing 53 disposed in a ferrule 44 on a stringer 31. The stringer 31 may be protected from contact with the particulate materials by the plate 19 and/or the wire 13a. Also, a molded guard may be attached to the stringer 31. The guard may be constructed from a wear resistant material and may be replaceable.

The present invention provides many unexpected advantages including the ability to provide a replacement wire screen panel constructed of steel into a system designed for urethane or rubber screen panels. The mounting plate 19 provides a secure economical mounting arrangement that eliminates the need to mold urethane or plastic rubber edges onto a steel screen panel and can provide protection for the stringer.

The present invention contemplates that many changes and modifications may be made. Therefore, while the presently-preferred form of the mounting system for a wire screen panel has been shown and described, and several modifications and alternatives discussed, persons skilled in this art will readily appreciate that various additional changes and modifications may be made without departing from the spirit of the invention.

The invention claimed is:
1. A system for mounting a wire screen panel to a frame for screening particulate materials, the frame having a stringer with a ferrule defined therein, the system comprising:
   a screen panel having a first plurality of wires and a second plurality of wires arranged to form a screen, the screen panel having a first side and a second side disposed opposite from the first side, the screen panel having a third side and a fourth side disposed opposite from the third side, the screen panel supported by the stringer;
   at least one first plate disposed along at least a portion of the length of the first side of the screen panel;
   at least one second plate disposed along at least a portion of the length of the second side of the screen panel;
   a fastener having a shaft and a head portion, the shaft configured and arranged to extend adjacent to the plate and engage with a bushing disposed in the ferrule in the stringer and the head portion engaging with the plate on the side of the plate opposite the stringer such that the screen panel is fixed in position relative to the frame; and, wherein the majority of the third and fourth sides of the screen panel are defined by the first and second plurality of wires only.

2. The system of claim 1, wherein the fastener is a bolt and the bushing has internal threads for receiving the bolt.

3. The system of claim 1, wherein the fastener is a pin.

4. The system of claim 1, wherein the bushing has a two piece construction with an outer adapter that fits into the ferrule and an inner sleeve that receives a pin.

5. The system of claim 1, wherein the at least one first plate or at least one second plate extends along the entire length of the first or second side of the screen panel.

6. The system of claim 1, wherein the screen panel is welded.

7. The system of claim 1, wherein the screen panel is woven.

8. The system of claim 1, wherein one of the wires is disposed adjacent to the first side of the screen panel.

9. The system of claim 1, wherein the at least one first plate or at least one second plate is disposed beneath the wires.

10. The system of claim 1, wherein the at least one first plate or at least one second plate has an opening defined therein for receiving the fastener.

11. The system of claim 1, wherein the first and second plurality of wires are constructed of high carbon steel.

12. The system of claim 1, wherein the plate is constructed of high carbon steel.

13. A system for mounting a wire screen panel to a frame for screening particulate materials, the frame having a stringer with a ferrule defined therein, the system comprising:
a screen panel having a first plurality of wires and a second plurality of wires arranged to form a screen, the screen panel having a first side and a second side disposed opposite from the first side, the screen panel having a third side and a fourth side disposed opposite from the third side, the screen panel supported by the stringer;
at least one first plate disposed along at least a portion of the length of the first side of the screen panel, the first plate having an edge with an opening defined therein;
at least one second plate disposed along at least a portion of the length of the second side of the screen panel, the second plate having an edge with an opening defined therein;
a fastener having a shaft and a head portion, the shaft configured and arranged to extend through the opening and engage with a bushing disposed in the ferrule in the stringer and the head portion engaging with the first or second plate around the opening such that the screen panel is fixed in position relative to the frame; and,
wherein the third and fourth sides do not have a frame along a substantial portion of their length.

14. The system of claim 13, wherein at least one of the wires is disposed directly above the stringer when the screen panel is mounted to the frame.

15. The system of claim 13, wherein the fastener is a pin.

16. The system of claim 13, wherein the bushing has a two piece construction with an outer adapter that fits into the ferrule and an inner sleeve that receives a pin.

17. The system of claim 13, wherein the first or second plate extends along the entire length of the first or second side of the screen panel.

18. The system of claim 13, wherein the screen panel is welded.

19. The system of claim 13, wherein the screen panel is woven.

20. The system of claim 13, wherein the fastener is a bolt and the bushing has internal threads for receiving the bolt.

21. A system for mounting a wire screen panel to a frame for screening particulate materials, the frame having a stringer with a ferrule defined therein, the system comprising:
a screen panel having a first plurality of wires and a second plurality of wires arranged to form a screen, the screen panel having a first side and a second side disposed opposite from the first side, the screen panel having a third and fourth side disposed opposite from the third side, the screen panel supported by the stringer;
a fastener having a shaft and a head portion, the shaft configured and arranged to extend through a washer disposed on top of the screen panel and to engage with a bushing disposed in the ferrule in the stringer beneath the screen panel, the head portion engaging with the washer on the top of the screen panel such that the screen panel is fixed in position relative to the frame; and,
wherein the first, second, third, and fourth sides of the screen panel do not have a frame along a substantial portion of their length.

22. A system comprising:
a frame configured for screening particulate materials, the frame having at least one stringer with a ferrule defined therein;
a screen panel having a first plurality of wires and a second plurality of wires arranged to form a screen, the screen panel having a first side and a second side disposed opposite from the first side, the screen panel having a third side and a fourth side disposed opposite from the third side, the screen panel supported by the stringer;
at least one first plate disposed along at least a portion of the length of the first side of the screen panel;
at least one second plate disposed along at least a portion of the length of the second side of the screen panel;
a fastener having a shaft and a head portion, the shaft configured and arranged to extend adjacent to the plate and engage with a bushing disposed in the ferrule in the stringer and the head portion engaging with the plate on the side of the plate opposite the stringer such that the screen panel is fixed in position relative to the frame; and,
wherein the majority of the third and fourth sides of the screen panel are defined by the first and second plurality of wires only.

* * * * *